(12) United States Patent
Hukkanen et al.

(10) Patent No.: US 11,273,880 B2
(45) Date of Patent: Mar. 15, 2022

(54) FOREST MACHINE

(71) Applicant: Ponsse Oyj, Vierma (FI)

(72) Inventors: Pentti Hukkanen, Vierema (FI); Kalle Einola, Vierema (FI); Jorma Hyvonen, Vierema (FI)

(73) Assignee: Ponsse Oyj, Vieremä (FI)

( * ) Notice: Subject to any disclaimer, the term of this patent is extended or adjusted under 35 U.S.C. 154(b) by 173 days.

(21) Appl. No.: 16/619,279

(22) PCT Filed: Jun. 5, 2018

(86) PCT No.: PCT/FI2018/050423
§ 371 (c)(1),
(2) Date: Dec. 4, 2019

(87) PCT Pub. No.: WO2018/224735
PCT Pub. Date: Dec. 13, 2018

(65) Prior Publication Data
US 2020/0094892 A1 Mar. 26, 2020

(30) Foreign Application Priority Data
Jun. 6, 2017 (FI) ...................................... 20175518

(51) Int. Cl.
*B62D 55/10* (2006.01)
*A01G 23/00* (2006.01)
(Continued)

(52) U.S. Cl.
CPC ........... *B62D 55/10* (2013.01); *A01G 23/003* (2013.01); *B62D 55/12* (2013.01); *B62D 55/0655* (2013.01)

(58) Field of Classification Search
CPC .... B62D 55/10; B62D 55/12; B62D 55/0655; B62D 55/0847; A01G 23/003
See application file for complete search history.

(56) References Cited

U.S. PATENT DOCUMENTS 2,135,619 A 11/1938 Johnston
2,651,378 A 9/1953 De La Llana
(Continued)

FOREIGN PATENT DOCUMENTS

CN 101365605 11/2006
CN 103502583 1/2014
(Continued)

OTHER PUBLICATIONS

Extended European Search Report for priority application PCT/FI2018/050423. 5 pages.
(Continued)

*Primary Examiner* — Minnah L Seoh
*Assistant Examiner* — Abigail R Hymel
(74) *Attorney, Agent, or Firm* — Beem Patent Law Firm

(57) ABSTRACT

The invention relates to a forest machine, comprising a chassis having sides, a swing bogie mounted on bearings to the chassis, comprising a swing frame, second sides and at least two wheels, a swing bearing attaching the chassis to mount the swing bogie, a power transmission arranged through the swing bearing in connection with the chassis, a support formed by two pairs between the chassis and the swing frame, each pair having a protrusion as a support surface and a rail as a counter surface to transmit lateral forces between the chassis and the swing frame during contact between the two surfaces, wherein each pair is located at a distance from the swing bearing on separate side of the swing bearing, and in each pair, one of the protrusions and the rail is attached to the side of the chassis and other to the second side of the swing frame.

17 Claims, 9 Drawing Sheets

(51) Int. Cl.
  *B62D 55/12* (2006.01)
  *B62D 55/065* (2006.01)

(56) References Cited

U.S. PATENT DOCUMENTS

| | | | |
|---|---|---|---|
| 3,494,632 A | | 2/1970 | Bostrom |
| 5,248,008 A | | 9/1993 | Clar |
| 5,897,123 A | | 4/1999 | Cherney et al. |
| 6,394,204 B1 * | 5/2002 | Haringer | B62D 55/0842 180/9.48 |
| 6,557,953 B1 * | 5/2003 | Kahle | B62D 49/0635 305/130 |
| 7,222,924 B2 * | 5/2007 | Christianson | B62D 55/10 305/125 |
| 8,240,783 B2 * | 8/2012 | Johnson | B62D 55/30 305/141 |
| 2008/0314659 A1 | 12/2008 | Einola et al. | |
| 2009/0256327 A1 * | 10/2009 | Waletzko | B62D 55/10 280/124.155 |
| 2015/0307144 A1 * | 10/2015 | Gustafson | B62D 55/10 305/120 |

FOREIGN PATENT DOCUMENTS

| | | |
|---|---|---|
| CN | 103963860 | 8/2014 |
| CN | 104363754 | 2/2015 |
| CN | 105952298 | 9/2016 |
| EP | 2058438 | 5/2009 |
| FI | 20175518 A1 | 12/2018 |
| GB | 116164 | 6/1918 |
| SU | 500109 | 1/1976 |
| SU | 1819231 | 5/1993 |
| WO | 2013178882 A1 | 12/2013 |
| WO | 2015162341 | 10/2015 |
| WO | 2018224735 | 12/2018 |

OTHER PUBLICATIONS

Finnish Search Report and office action related to priority Finnish application FI 20175518. dated Jan. 4, 2018. (6 pages).

International Search Report from PCT/FI2018/050423. dated Sep. 12, 2018. (3 pages).

* cited by examiner

FOREST MACHINE

CROSS-REFERENCE TO RELATED APPLICATIONS

This application claims benefit of PCT/FI2018/050423 filed Jun. 5, 2018, which claims benefit of Finnish Patent Application No. FI 20175518, filed Jun. 6, 2017, each of which is incorporated by reference in its entirety.

FIELD OF THE INVENTION

The invention relates to a forest machine, comprising
  a chassis having sides;
  a swing bogie mounted on bearings to the chassis, comprising a swing frame, second sides and at least two wheels mounted on the swing frame in bearings at a distance from each other;
  a swing bearing attaching the chassis to mount the swing bogie in bearings on the chassis;
  a power transmission fitted in connection with the chassis to transmit power to the wheels of the swing bogie;
  a support fitted between the chassis and the swing frame for supporting the swing frame at least sometimes on the chassis, the support is located at a distance from the swing bearing.

BACKGROUND OF THE INVENTION

The work machines used in mechanical timber harvesting unavoidably cause a certain loading on the forest floor, the ground, and in thinning sites also on the roots of the trees left to grow. The problem is typically less in the case of a harvester, which does not need to carry a load in addition to its own weight, as in the case of the forwarder according to FIG. 1. In other words, there is usually a significant difference in the surface pressure imposed on the ground by the said forest machines. Attempts have been made to reduce the surface pressure imposed on the ground by the said machines through various known solutions by increasing the area of contact between the ground and the forest machine. Because the width of forest machines is limited by the provisions of the Road Traffic Act in the case of their road transfers, it has been sought to increase the area of contact by using longer crawler-track units.

The applicant's own publication WO 2015/162341 A1 is known from the prior art, in which a chassis-steered forest machine 100 according to FIG. 1 is shown, which includes crawler-track units 15 for supporting the forest machine 100 on the ground. The forest machine's 100 chassis 12 is in two parts, comprising a first chassis 13 and a second chassis 17 connected to each other with a joint, in connection with, and on each side of which is a single crawler-track unit 15. The forest machine's cab 46 and engine 48 are situated on the first chassis 13, while the load space 50 is on the second chassis 13. The load space 50 extends in the lateral direction of the forest machine 100 on top of the crawler-track unit 15, to increase the capacity of the load space 50. Power is transmitted from the engine 48 with the aid of the power transmission 19 inside the forest machine's 100 first chassis 13 and second chassis 17 and distributed laterally from the centre of the forest machine's 100 second chassis 17 to the crawler-track units 15. Each crawler-track unit 15 is supported on the chassis 12 with the aid of swing bogies 14, which permits the crawler-track units 15 to swing according to the ground, around a swing bearing 20 between the swing bogie 14 and the chassis 12. In this forest machine, swing-bogie wheels can also be used instead of the crawler-track units, which swing-bogie wheels are pivoted to the forest machine's first and second chassis with the aid of the same swing bearings.

However, in the case of publication WO 2015/162341 A1 of the prior art, the use of a longer crawler-track unit causes the stresses imposed by uneven ground on the swing bearing to increase. The unevenness of the ground tends to push the wheels mounted in bearings in the swing bogie in the lateral direction of the forest machine or to twist the swing bogie relative to the longitudinal direction, when the long swing frame of the swing bogie forms a long moment arm relative to the swing bearing, imposing a high torque on the swing bearing. This in turn shortens the swing bearing's service life or even breaks the swing bearing.

SUMMARY OF THE INVENTION

The invention is intended to create a forest machine, in which the stresses induced in the swing bearings of swing bogies, and particularly long swing bogies, can be reduced by means of a simple solution. The invention is characterized by a forest machine, comprising a chassis having sides, a swing bogie mounted on bearings to the chassis, comprising a swing frame, second sides and at least two wheels mounted on the swing frame in bearings at a distance from each other, a swing bearing attaching the chassis to mount the swing bogie in bearings on the chassis, a power transmission arranged through the swing bearing fitted in connection with the chassis to transmit power to the wheels of the swing bogie and a support formed by two pairs fitted between the chassis and the swing frame for supporting the swing frame at least sometimes on the chassis, each pair having a protrusion as a support surface and a rail as a counter surface in order to transmit lateral forces between the chassis and the swing frame during contact between the support surface and the counter surface, wherein each pair is located at a distance from the swing bearing each on separate side of the swing bearing, and in each pair one of the protrusion and the rail is attached to the side of the chassis and other to the second side of the swing frame.

The forest machine's lateral forces acting of the swing bogies can be received in the forest machine's chassis not only by the swing bearings, but also with the aid of the support surface and counter-surface pair or pairs, at a distance from the swing bearing on both sides of the swing bearing. The transmission of the forces between the swing frame and the forest machine's chassis is then symmetrical relative to the swing bearing. The lateral forces acting on the swing frame are transmitted to the forest machine's chassis with the aid of a simple mechanical construction, so that the lateral forces acting on the swing bearing, caused by the unevenness of the ground remain small, even when using long swing bogies. The lateral forces cause lateral stresses in the forest machine over the distance between the wheels and the support in the swing frame. The support can be fitted both to new forest machines during manufacture and also retrofitted to existing forest machines.

The forest machine's lateral forces due to unevenness in the ground can be transferred between the swing frame and the forest machine's chassis not only with a swing bearing but also with the aid of the support. For example, a stone, which is partly at the side of the first wheel in the direction of travel of the swing bogie, causes a lateral force in the wheel, which seeks, through the swing frame, to twist the swing bearing, as it is transmitted through the swing bearing to the forest machine's chassis. Using the support, the force can be transmitted closer to the wheel directly between the swing frame and the forest machine's chassis, thus reducing the stress acting on the swing bearing. It should be understood that, when speaking of the support surface and the counter surface, their location is not restricted so that the support surface is, for example, in a protrusion and the counter surface in a rail, or that the support surface is in the swing frame and the counter surface in the forest machine's chassis. The mutual location of the support surface and the counter surface can also be vice versa, depending on which surface is termed the support surface and which the counter surface.

The support is a separate component from the swing bearing.

The support surface and the counters surface are preferably equally far from the swing bearing and opposite relative to each other. They can then transmit the forest machine's lateral forces when required.

The support is preferably arranged to receive both compressive and tensile forces. The forest machine can then be implemented using the support asymmetrically on only one side of the swing bogie. On the other hand, if such support is used symmetrically on both sides of the swing bogie, the support will act simultaneously to receive and transmit external loadings while one support surface and counter surface pair receives compressive force and correspondingly a second pair receives tensile forces on the opposite side of the swing frame to the swing bearing.

Each pair preferably includes two support surfaces and counter surfaces for receiving and transmitting compressive and tensile forces. With the aid of two support surfaces and counter surfaces each pair can receive both compressive and tensile forces, so that the transmission of forces from the swing frame to the forest machine's chassis can take place using either only one pair or through both pairs in the swing frame on both sides of the swing bearing.

According to one embodiment, the support surface is a protrusion attached to the swing frame and the counter surface is a rail fitted to the forest machine's chassis. Such a pair is simple to implement and install also as a retrofit in existing forest machines.

The protrusion preferably includes a structure protruding from the protrusion in the direction of the diameter of the protrusion, in which support surface are formed as transverse planes of the protrusion, and the rail includes corresponding counter surfaces to the protruding structure of the protrusion. In such a construction the protrusion's protruding structure runs between the counter surfaces of the wear surface, so that contact is formed between the support surface at the end of the protrusion and the bottom of the wear surface during lateral compressive loading of the swing bogie. Correspondingly, a contact is in turn formed between the support surface and the counter surface of the wear surface farther from the chassis of the forest machine, when lateral tensile forces act on the swing bogie.

The rail is preferably a C rail in cross-section, opening towards the swing frame. Two counter surfaces are automatically formed in such a construction, which together with the protrusion form a lateral shape-locking structure transmitting both compressive and tensile forces in the lateral direction of the forest machine.

According to one embodiment, the C rail is closed at the ends, thus preventing access by the protrusion outside the C rail. The closed C rail then acts at the same time as a roll limiter for the swing bogie.

In each pair, the counter surface is preferably formed to be curved, to correspond to the path of motion when the swing bogie swings. Thus the support surface and counter surface pair transmits force between the swing frame and the forest machine's chassis in all attitudes of the swing bogie, no matter how much the swing bogie has rotated.

According to a second embodiment, the support includes an arm, a wheel mounted in bearings at the end of the arm thus forming a support surface and a plate thus forming a counter surface to the support surface formed by the wheel. In such an embodiment, the contact between the support surface and the counter surface can roll, when the swing bogie swings under lateral load.

The distance of each pair from the swing bearing can be 20-45%, preferably 35-40% of the length of the swing frame in the direction between the wheels. The distance between the wheel and the pair formed by the support surface and the counter surface then remains so small that the stresses acting on the swing frame remain insignificant.

The forest machine preferably includes a crawler-track unit, which includes an endless crawler track and the said swing bogies together with wheels.

Alternatively, the wheels of the swing bogie are rubber wheels and the swing bogie is then part of the set of bogie wheels.

The forestry machine preferably includes attachment equipment for attaching the support surface of each pair to the swing frame and attaching the counter surface to the forest machine's chassis. With the aid of the attachment equipment, it is simple to install the support in a forest machine and to detach it for maintenance.

The attachment equipment can be, for example, bolts, with openings formed in the swing frame, the forest machine's chassis, and the support for the bolts.

Alternatively, the support can also be welded to the forest machine. It is, however, more difficult to service welded parts than removably attached attachment equipment.

According to one embodiment, the pair formed by the support surface and the counter surface can include locking means for locking the swing bogie rigidly, thus preventing the swing bogie from rotating around the swing bearing. The locking means can be, for example, a structure like a disc-brake operating cylinder fitted in connection with the protrusion. Correspondingly, the locking means can also be a hydraulically-controlled rod and a corresponding hole.

The location of the pair is preferably arranged according to the swing limits of the swing bogie, so that the support surface always remains on the counter surface within the extreme limits of the swinging of the swing bogie. This avoids the support surface being able to bypass the counter surface in an extreme position of the swinging of the swing bogie when the forest machine's lateral forces act, in which case as the swing bogie returns to the horizontal attitude the support surface and counter surface could meet each other in the direction of swing, thus causing damage.

The support surface and counter surface preferably both form planes, which planes are perpendicular to the axis of rotation of the swing bearing. The contact surface area of the support surface and counter surface being sufficiently large the lateral forces then act perpendicularly to the planes.

The support surface and counter surface of the forest machine are preferably of wear-resistant steel, such as, for example, the wear-resistant steel marketed under the product name Hardox 400-800.

The wear-resistant steel can be surfaced, for example, with a nano-coating or a Teflon-coating, or with some other functional surfacing in order to create better sliding or rolling-friction properties, or wear-resistance, or a combination of these, for example, a hot-sprayed ceramic coating.

The support surface of the forest machine can be, for example, a polyethylene sliding piece, the counter surface still being wear-resistant steel. The support surface of wheel structure according to FIG. 4B can preferably be of sliding-bearing metal.

According to one embodiment, the width of the support surface and the counter surface can be 5-30 cm, preferably 10-25 cm, and the length of the counter surface in the direction of the circle of rotation of the swing bearing is 15-60 cm, preferably 30-40 cm. The surface area of the counter surface can be in the range 75-1800 cm2, preferably 300-800 cm2.

In this context, the term swing bogie refers to a structure intended to support wheels, in which the wheels are permanently locked relative to each other in a swing frame, which is in turn pivoted with the aid of a swing bearing to the forest machine's chassis. When the front wheel of the swing bogie rises with the ground, the swing frame rotates around the swing bearing and the rear wheel moves downwards. This permits better controllability of the forest machine in a forest and minimizes unexpected movements of the forest machine.

The operation of the support is based on the fact that in a normal situation, in which lateral torsion forces do not act on the swing bogie, the support surface and counter surface run in the immediate vicinity of each other, or are at most in light contact with each other. When lateral forces arise, the support surface and counter surface immediately form a contact, which transmits the lateral forces from the swing frame to the forest machine's chassis, so that only some of the forces are transmitted through the swing bearing of the swing bogie.

The forest machine preferably comprises a load space. The forest machine according to the invention is particularly suitable for carrying a load, because in it the support of the swing bogie is made robust by increasing the lateral support of the swing bearing. The load space, and the timber in it make the forest machine heavier and thus more exposed to lateral stresses, which, using the arrangement according to the invention, can be received without stressing the swing bearing.

Preferably at least one wheel in each swing bogie is a drive wheel. Power transmission is then arranged through the swing bearing to the drive wheel, thus exposing the swing bearing to lateral stresses. The forest machine is then suitable for use on rough terrain.

The power transmitted through the swing bearing can be transmitted inside the swing bogie's swing frame to the drive wheel. The internal power transmission of the swing bogie is then protected from knocks.

The swing bogie is preferably supported on the forest machine's chassis with the aid of a swing bearing located essentially symmetrically in the swing bogie. Essentially symmetrical support refer to the fact that the location of the swing bearing is at most 10% to the side of the longitudinal centre point of the swing frame. Using essentially symmetrical support of the swing bogie achieves essentially symmetrical driving properties in both directions for the forest machine. The forest machine according to the invention then receives lateral forces effectively on both sides of the swing bearing.

BRIEF DESCRIPTION OF THE DRAWINGS

In the following, the invention is described in detail with reference to the accompanying drawings shown some embodiments of the invention, in which.

DETAILED DESCRIPTION OF THE INVENTION

Figure 1:
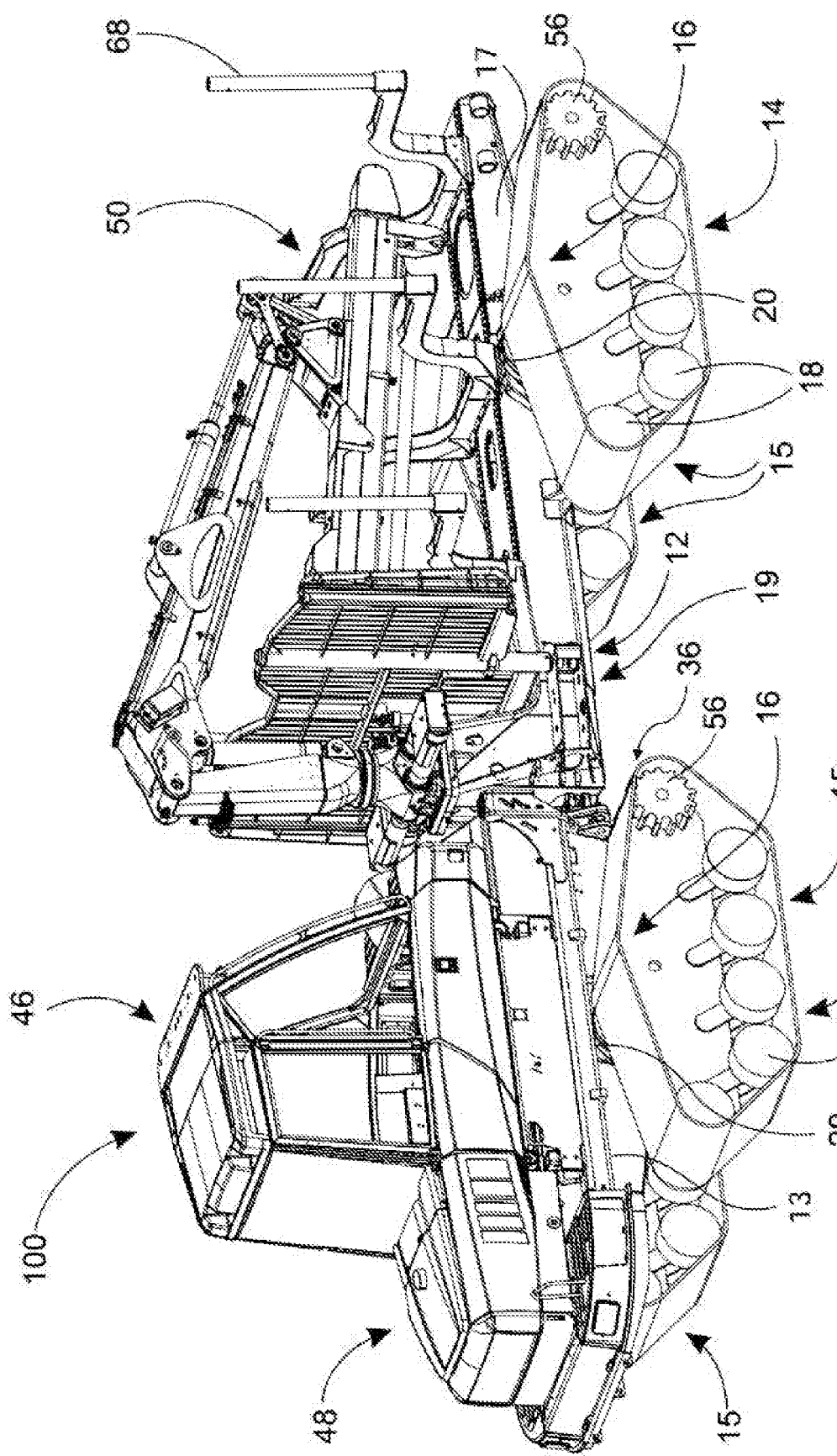
FIG. 1 shows an axonometric view of a forest machine according to the prior art.

The support can be formed in a forest machine 100 according to the prior art, shown in FIG. 1, which includes a chassis 12 comprising a first chassis 13 and a second chassis 17, a swing bogie 14 mounted in bearings on the chassis 12 comprising a swing frame 16 and at least two wheels 18 mounted in bearings at a distance from each other, and a power transmission 19 arranged inside the chassis 12 for transmitting power to the swing bogie 14 and through it to the wheels 18. In addition, the forest machine includes a swing bearing 20 attached to the chassis 12 for mounting the swing bogie 14 in bearings on the chassis 12, through which swing bearing 20 the power transmission to the swing bogie 14 is arranged. The support is arranged between the swing frame 16 of the swing bogie 14 and the forest machine's 100 chassis 12 at a distance from the swing bearing 20.

Figure 2:
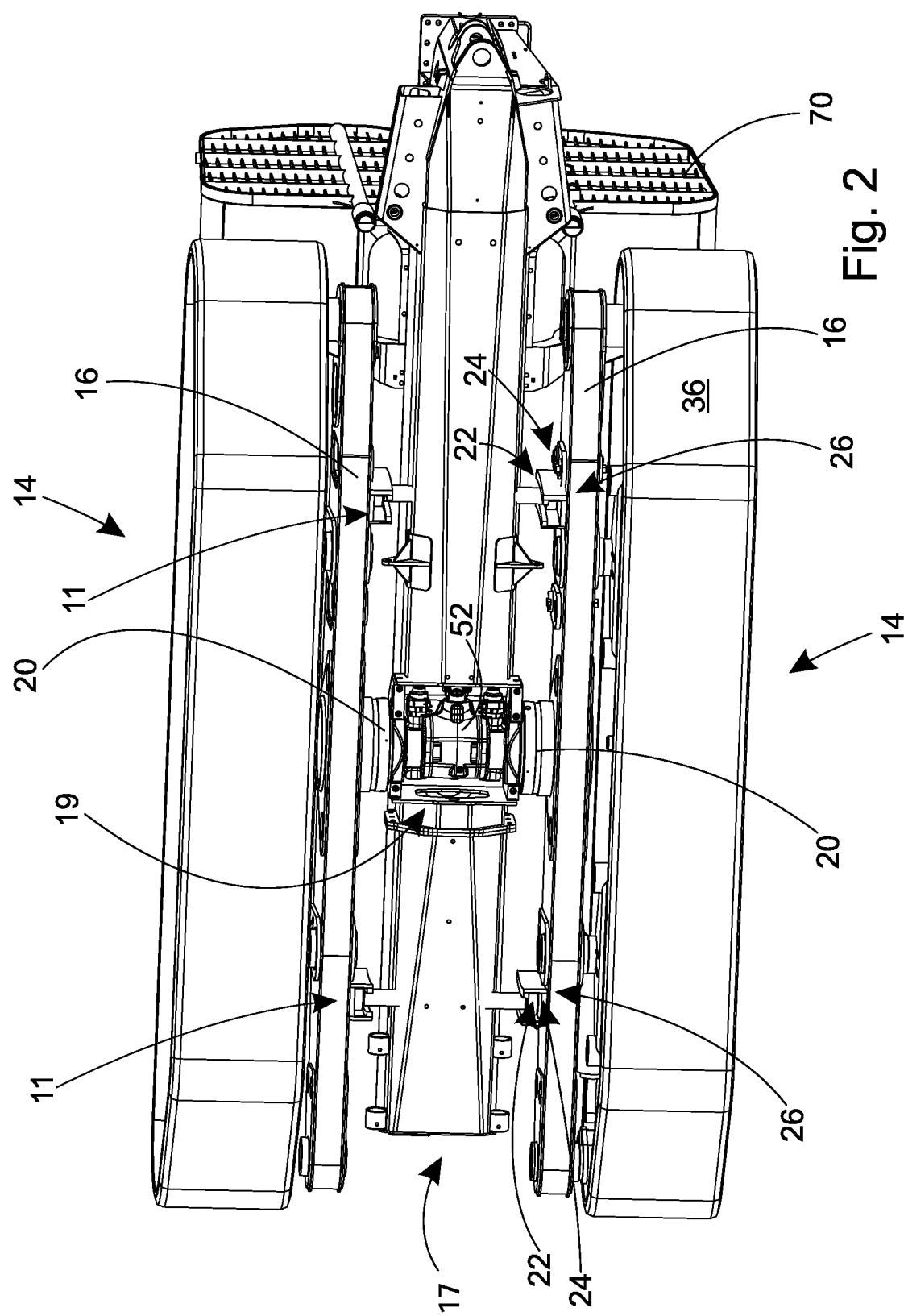
FIG. 2 shows the forest machine seen from under the forest machine's chassis.
Figure 3:
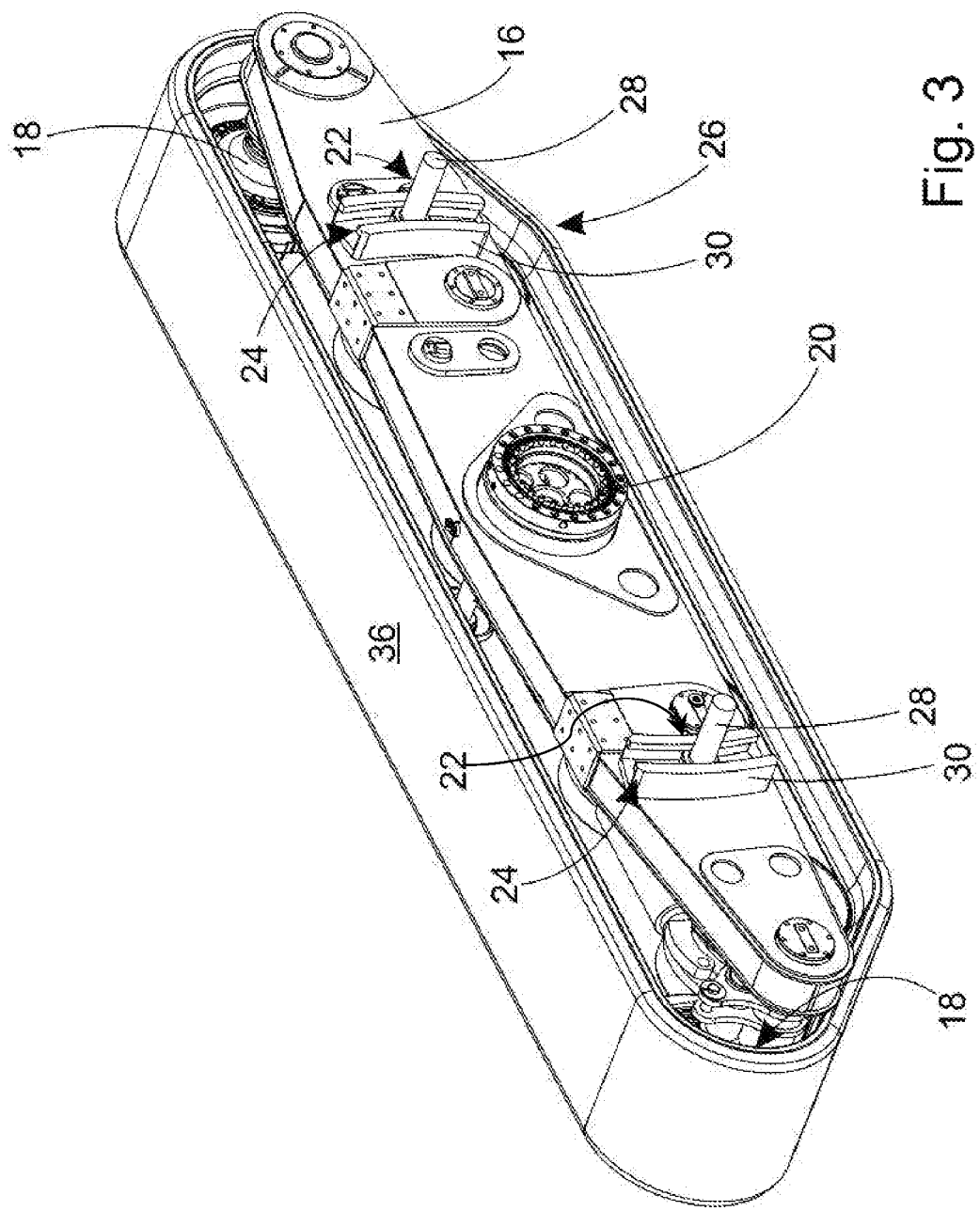
FIG. 3 shows an axonometric view of the support fitted in connection with a forest machine, with the swing bogie detached.

FIG. 2 shows the support in connection with the forest machine's 100 second chassis 17. According to FIG. 2, a swing frame 16, belonging to the swing bogie 14, is pivoted to the forest machine's chassis 12 with the aid of a swing bearing 20. The power transmission 19 is taken through a differential 52 through the swing bearing 20 to the swing frame 16, inside which the power can be transmitted to the wheels, in this case to the drive wheel 56 of the crawler-track unit 15, which can be seen in FIG. 6. The wheels 18 of the crawler-track unit 15 are surrounded by an endless crawler track 36, to which power is transmitted with the aid of the drive wheel 56. The support 11 is arranged in the lateral direction of the forest machine between the forest machine's chassis 12 and the swing frame 16. In the embodiments shown in FIGS. 2-6, the support 11 is arranged on both sides of the swing bearing 20 in the swing frame 16, but it should be understood that the forest machine can also be implemented with the aid of a support on only one side, provided the support is arranged to transmit both compressive and tensile force. On one side means that the support is in the swing frame only in the space between the swing bearing and one wheel.

When using a support 11 fitted on both sides of the swing bearing 20 according to FIGS. 2-6, the forest machine's lateral forces are transmitted on uneven terrain through the wheels to the swing frame 16 and from the swing frame 16 through the swing bearing 20 and the support 11 to the forest machine's chassis 12. In situations, in which lateral forces do not act on the wheels, or the forces are very small, only the swing bearing 20 transmits force from the swing frame 16 to the forest machine's chassis 12. At their simplest, the support 11 can be only a piece fitted to either the swing frame 16 or the forest machine's chassis, which protrudes sufficiently far that contact is nearly formed between the swing frame and the forest machine's chassis. From the effect of the lateral loads, the piece forms contact with either the forest machine's chassis or the swing frame, thus transmitting force between the forest machine's chassis and the swing frame. This piece can be fixed, but it can also be, for example, a sliding bearing or some rotating structure. In all cases, a support surface and its counter surface are formed, in the contact between which force and counter-force are transmitted in the lateral direction of the forest machine.

In FIGS. 2-4A, 5, and 6, the support surface 22 and counter surface 24 of the support 11 is formed with the aid of an elongated protrusion 28 and a rail 30. The protrusion can be, for example, a pin or some other similar elongated piece. The rail 30 is preferably formed with a curved shape, so that it corresponds to the mutual path of motion of the forest machine's chassis and the swing frame, when the swing bogie swings. Alternatively the rail can also be straight, because the radius of curvature at a distance from the swing bearing is small. The rail should then have a slightly greater clearance that in the case of a curved rail. In this case, the rail is a C-shaped rail 30 opening in the lateral direction of the forest machine, in which two counter surfaces 24 are formed, according to FIG. 4A. The protrusion 28 also preferably includes a structure 32 protruding in the direction of the radius of the protrusion 28, thus forming two support surfaces 22 in the protrusion 28. Thus according to FIG. 4A, in each pair 26 the support surface 33 in the end 60 of the protrusion 28 is at least sometimes in contact with the counter surface 35 in the bottom 62 of the rail 30 in order to receive compressive forces, and in turn in the protruding structure 32 of the protrusion 28 on the opposite side relative to the support surface 33 there is a support surface 34, which is at least sometimes in contact with the counter surface 37 of the walls 64 of the rail 30 in order to transmit tensile forces. In other words, the protrusion 28 and the rail 30 form a shape-closed pair in the lateral direction of the forest machine, to transmit forces in this direction. On the other hand, when the rail 30 is curved longitudinally it permits the protrusion to move freely in the groove formed by the rail when the swing bogie swings. Both the support surfaces and the counter surfaces can preferably be made of a material with good sliding properties, or can be coated with a material with a small coefficient of friction, for example, a Teflon coating. The support surfaces and counter surfaces can also include separate wear pieces, which can be changed when necessary.

Figure 4A:
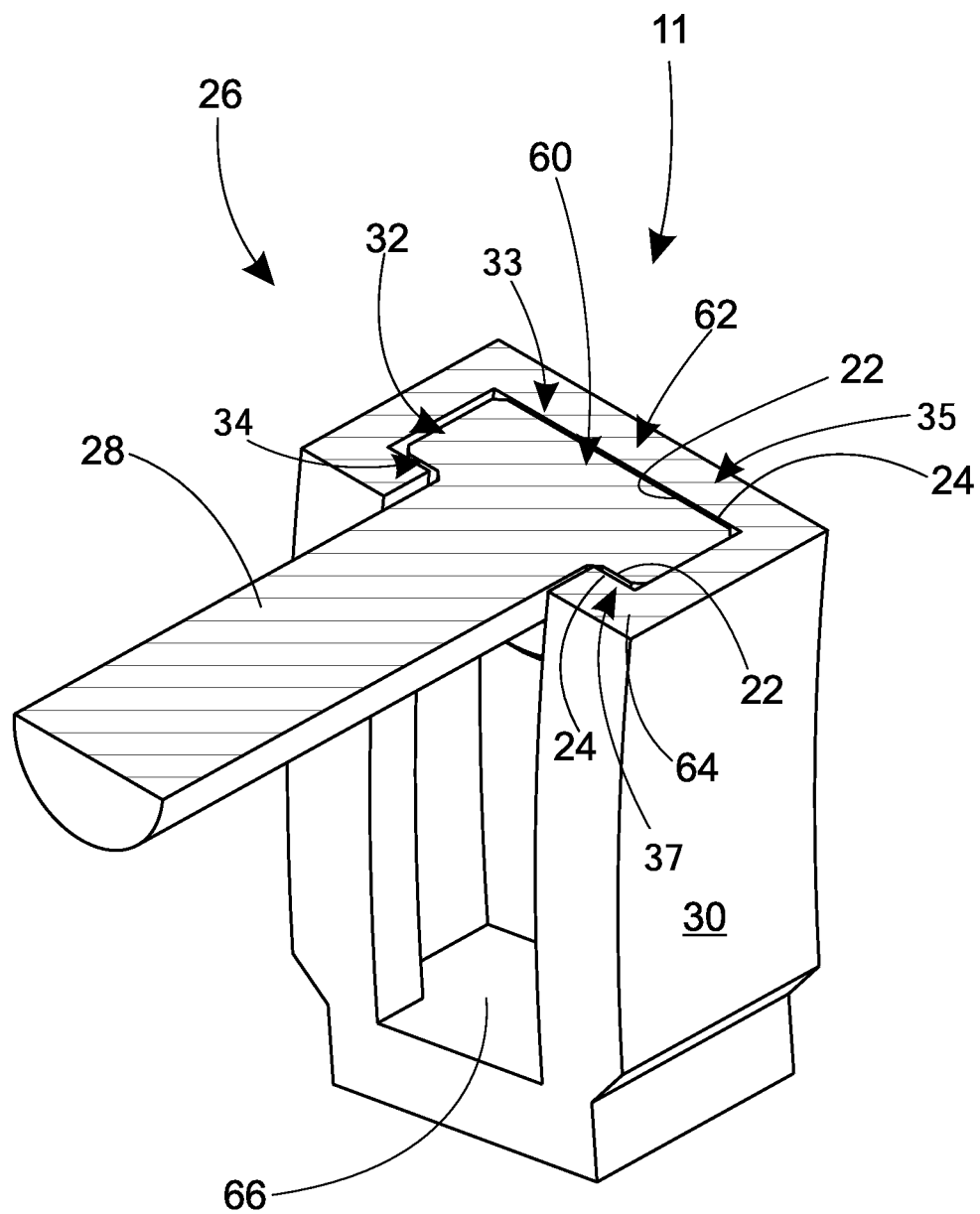
FIG. 4A shows an enlargement of the support of one embodiment of the support as an axonometric cross-section.

The rail 30 can be open at the ends, or closed at the ends according to FIG. 4A, when the rail 30 also forms a surface 66, which acts as a roll limiter of the swing bogie.

When implementing the support with the aid of a protrusion and rail according to FIGS. 2-4A, 5, and 6, the protrusion and rail can be placed freely with the protrusion being in either the swing frame or the forest machine's chassis and the rail in the other of these.

Figure 4B:
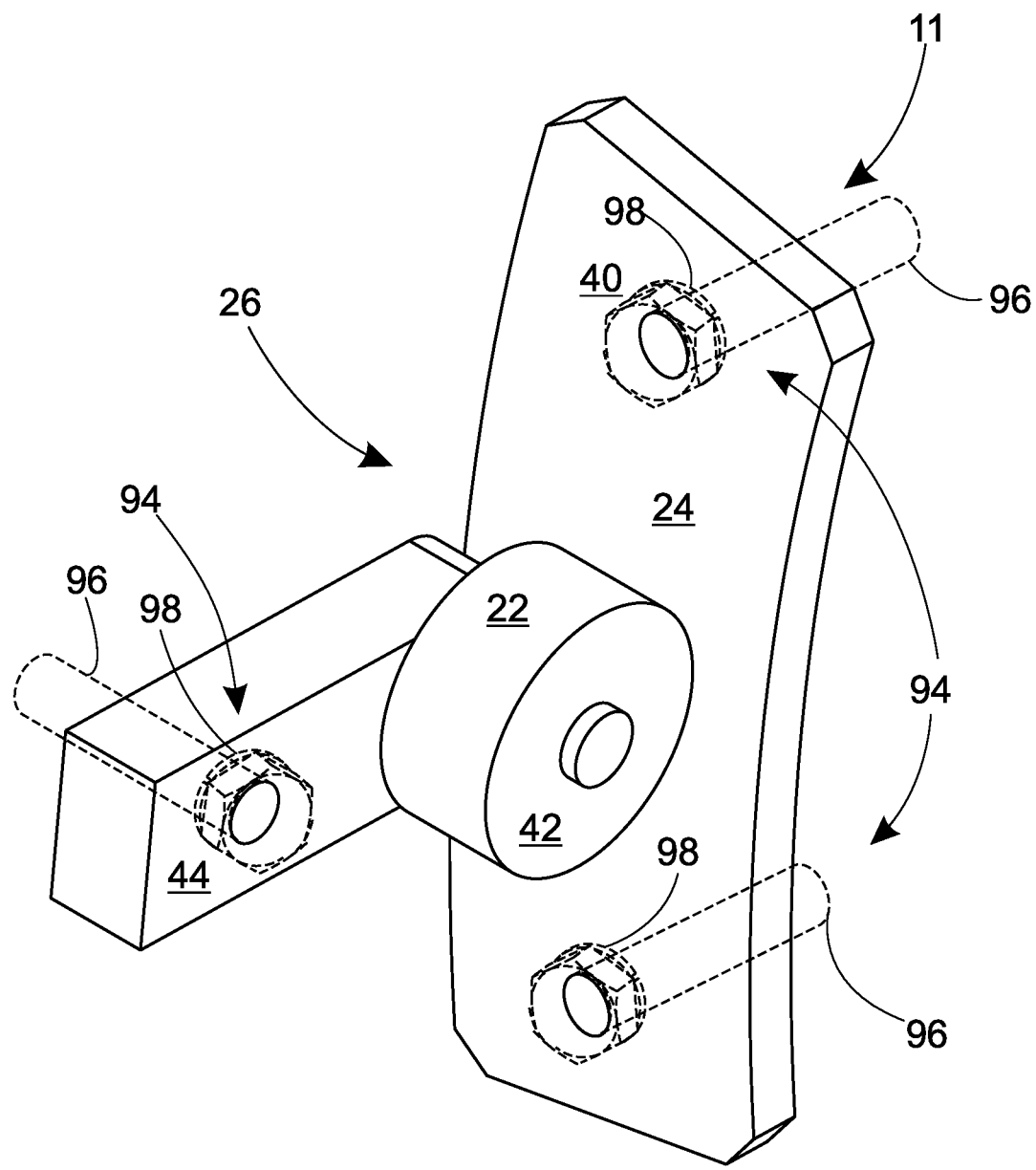
FIG. 4B shows an enlargement of the support of another embodiment of the forest machine as an axonometric cross-section.
Figure 5:
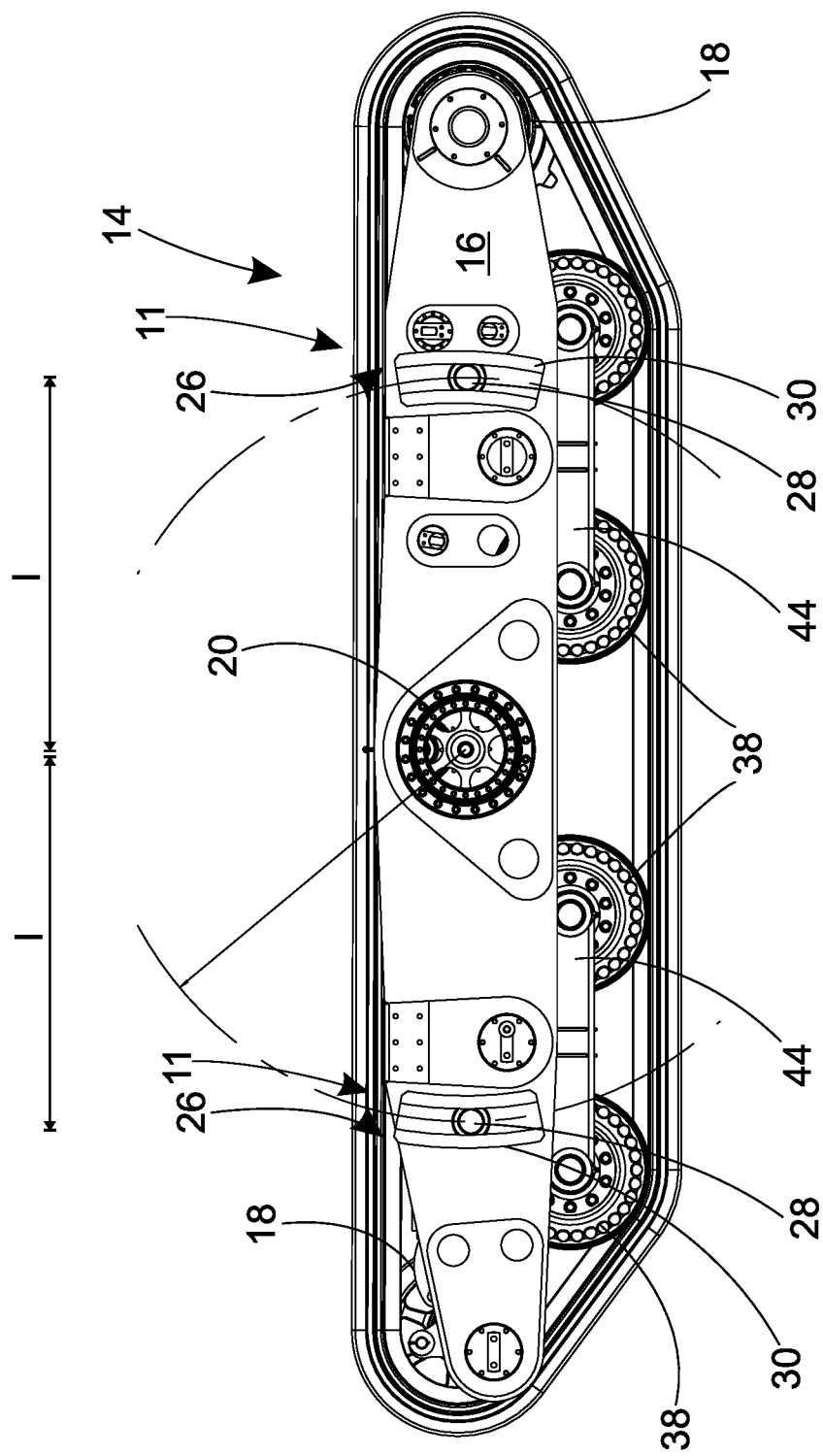
FIG. 5 shows a side view of the forest machine, with the swing bogie detached.

Alternatively, the support 11 can also be implemented as a construction according to FIG. 4B, in which an arm 44, at the end of which a wheel 42 is mounted in a bearing, is attached to the swing frame or the forest machine's chassis. The wheel 42 forms a support surface, which is in contact with a plate 40 attached to the swing frame or chassis opposite to the arm, which forms a counter surface 24. Such a support-means construction can, however transmit only compressive forces, unless, for example, a rail forms the counter surface, which permits the wheel to be supported with the aid of two counter surfaces. According to one embodiment, the wheel 42 can be a cogwheel and the counter surface can form, for example, a gearchain.

The support can be manufactured in new forest machines directly by welding already in the production stage. Alternatively, the support can be attached with bolted joints acting as attachment equipment 94, according to FIG. 4B, when they can be easily changed and serviced when they wear during contact. The attachment equipment 94 can include, for example openings 98 and bolts 96, with the aid of which the support is attached to a forest machine. Correspondingly, the support can be fitted to existing forest machines by forming in the forest machine, for example, the openings needed for bolt attachments.

Figure 6:
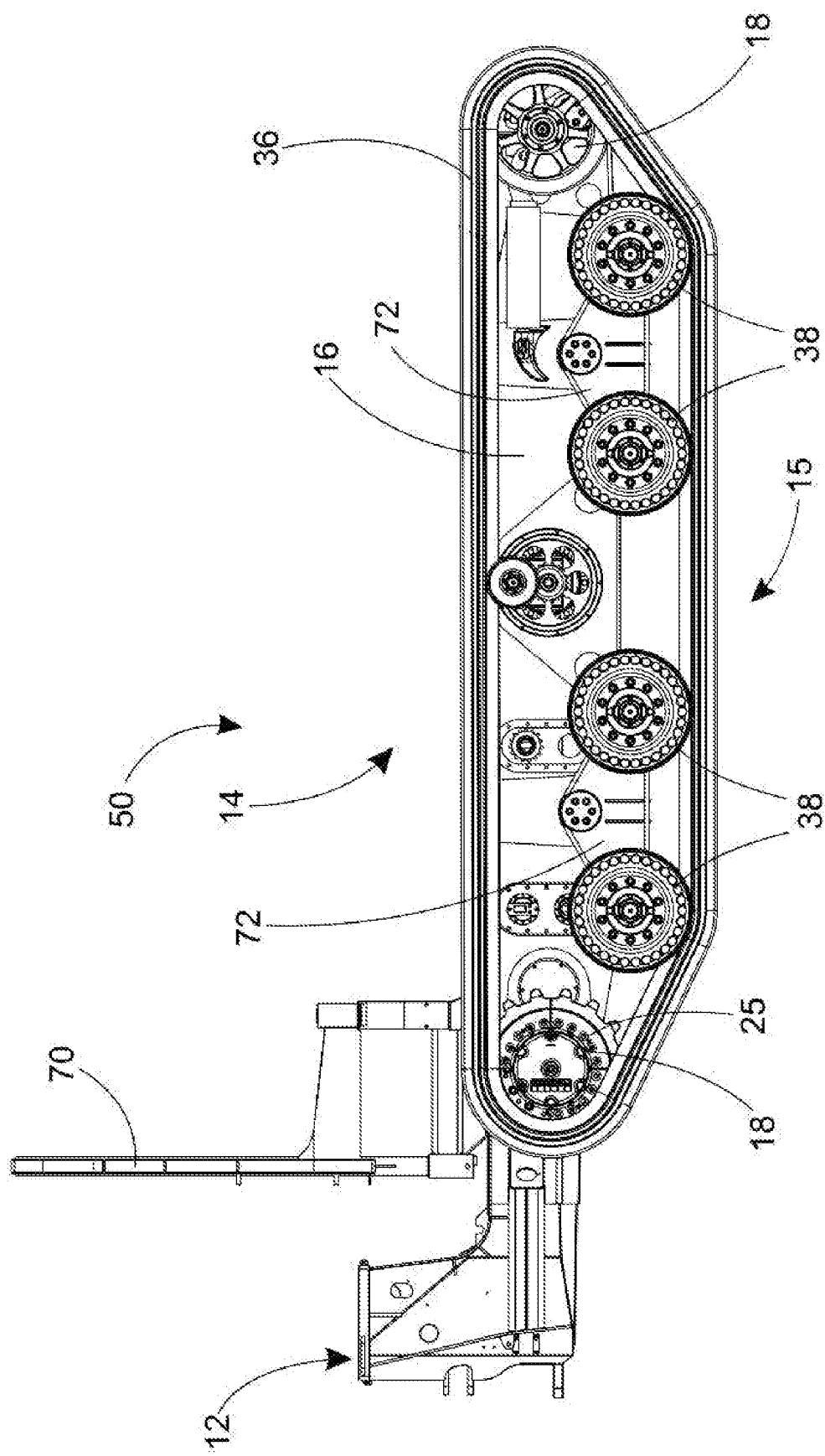
FIG. 6 shows a side view of the rear part of a forest machine.

FIG. 6 shows the forest machine's second chassis and the load space 50 formed on it, without the bunks 68 according to the prior art visible in FIG. 1. The bunks and log gate 70 delimit the load space 50. The support is especially important in forest machines using high load spaces, as the center of gravity of a high-placed load easily moves significant distance to the side of the centre line of the forest machine when the machine tilts. The loading acting on the swing bogies then also moves from a situation of even loading, in which the load is distributed on both swing bogies to a situation of uneven loading, in which the load is distributed mostly onto one swing bogie, the other remaining with a considerably smaller loading. In this situation, the swing bogie's lateral loading further increase the strain acting on the swing bearing. The swing bogie 14 can include support wheels 38 attached to the swing frame 16 by separate swing arms 72.

The support 11 is located at such a distance I (in FIG. 5) from the swing bearing 20, that they are able to transmit power laterally in all the swinging attitudes of the swing bogie 14. In other words, in a long swing bogie the support cannot be located so far away to that the support surface and the counter surface are not opposite each other in some attitude of the swing bogie. On the other hand, the support should be as far as possible from the swing bearing, so that the distance between the support and the wheel will remain as small as possible. This seeks to minimize the moment arm between the wheel and the support, which causes torsion in the swing frame. For example, in a swing bogie, the length of the swing frame of which is 2 m, the support is preferably located 60 cm from the swing bearing.

Figure 7:
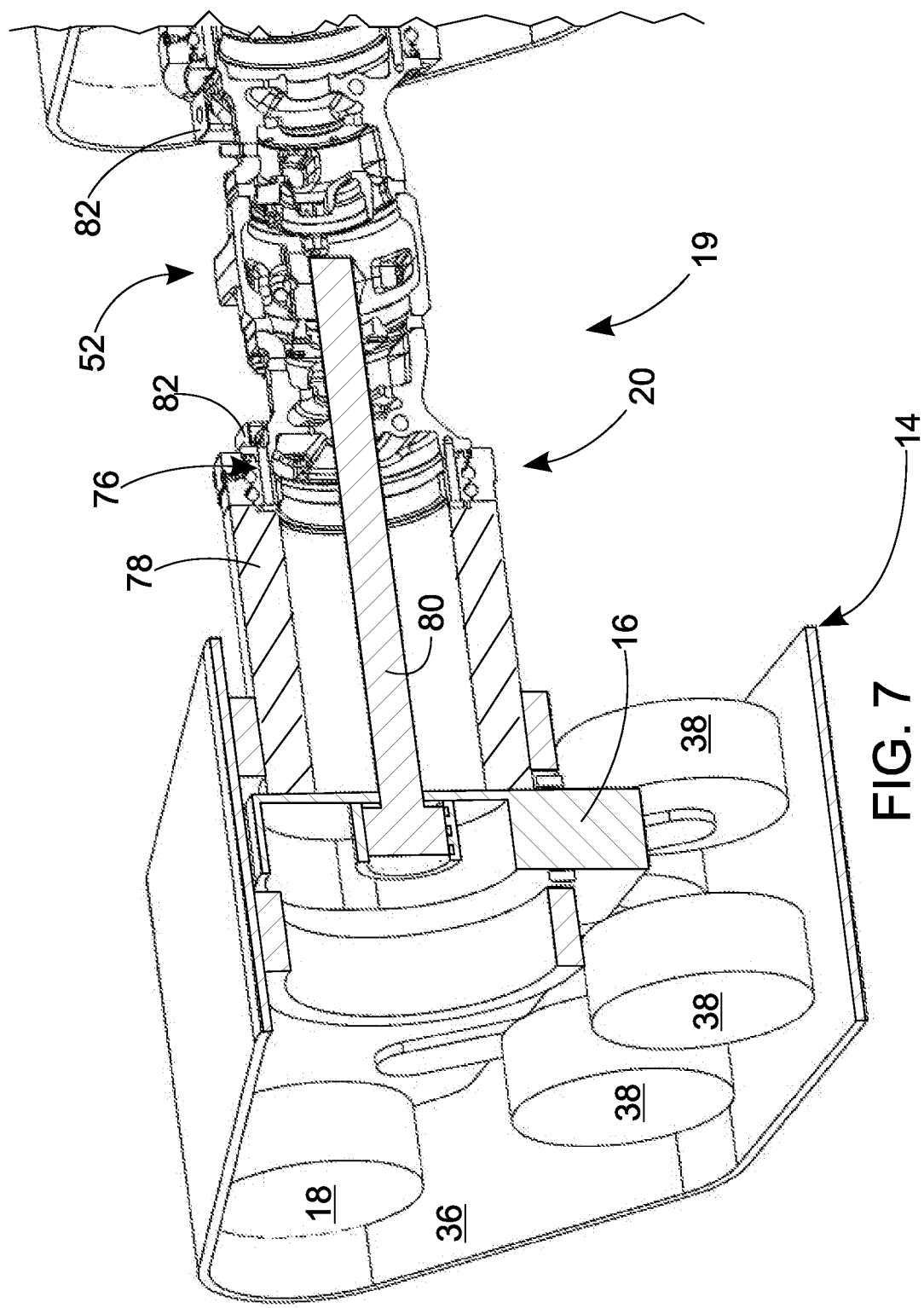
FIG. 7 shows an axonometric view of the internal power transmission of a forest machine according to the invention, with the swing bogie partly open.

According to FIG. 7, the bogie frame 16 is mounted in bearings with the aid of sleeve axle 78 in the swing bearing 20 coaxially relative to the drive shaft 80. In FIG. 6, reference number 82 refers to the attachment point of the differential 52, by which the differential is attached permanently to the forest machine's chassis, for example by bolts 76. In this connection, it should be understood that the part to the left side of the attachment point 82, i.e. the swing bogie according to the invention is supported on the outer surface of the swing bearing 20 and rotates with its aid, whereas the differential and its parts are fixed.

Figure 8:
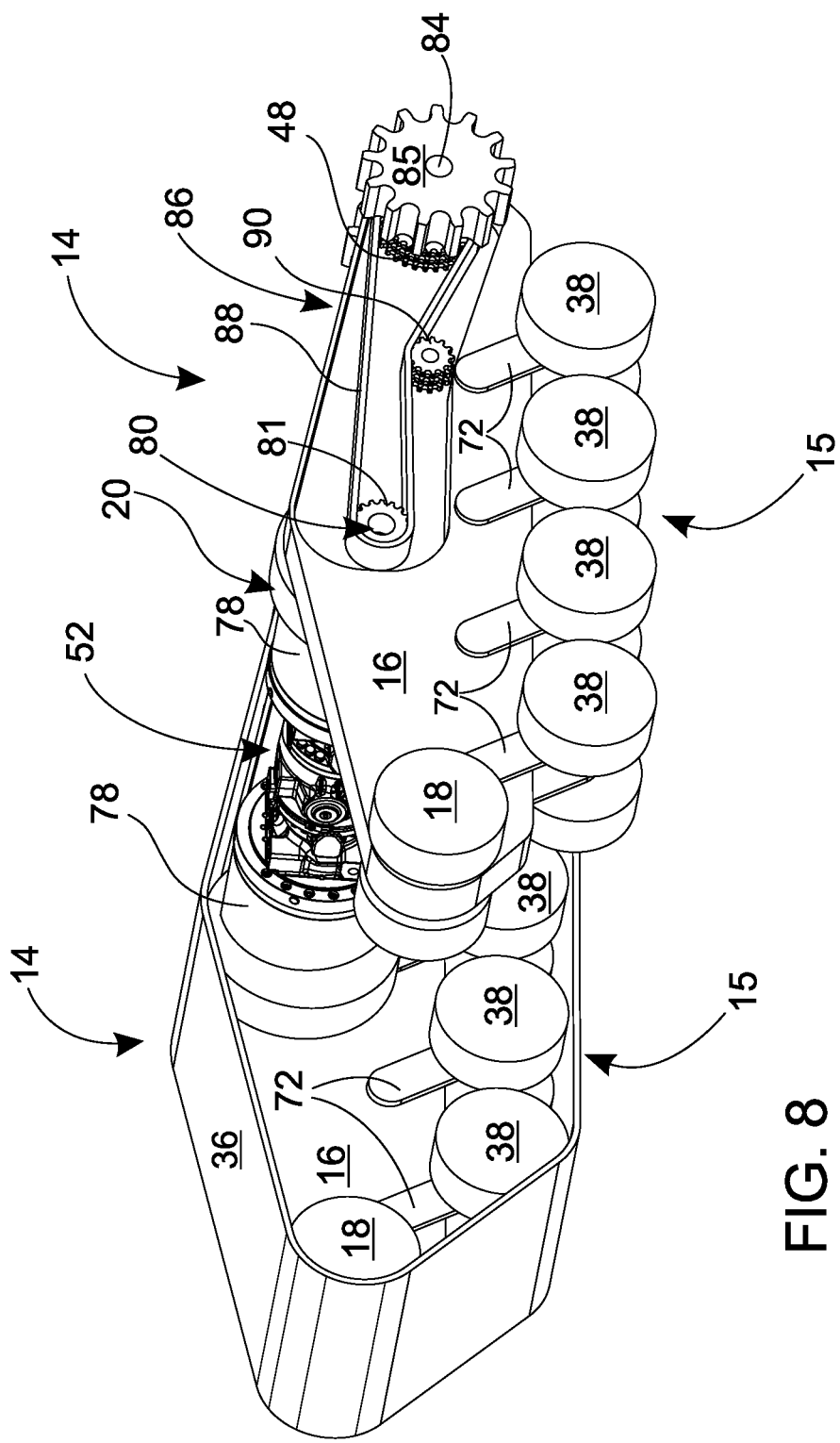
FIG. 8 shows an axonometric cross-section of the power transmission of a forest machine according to the invention.

According to FIG. 8, each swing bogie 14 can include a crawler-track frame 16, a sleeve axle 78 attached to the crawler-track frame 16 for supporting the crawler-track frame on the swing bearing 20 belonging to the forest machine, a drive shaft 80 mounted in bearings at one end to the crawler-track frame 16 coaxially relative to the sleeve axle 78 and at the other end to the power transmission 19, and a crawler track 36 arranged in an endless loop around the crawler-track frame 16. Further, the swing bogie 14 includes at least one drive wheel 25 for rotating the crawler track 36, mounted on an axle to the crawler-track frame 16 using a separate axle 84 to the drive shaft 80, and the swing bogie's 14 power transmission means 86 for transmitting power from the drive shaft 80 to the drive wheel 25. In addition, the swing bogie 14 further includes support wheels 38 arranged to conform to the shape of the surface of the ground, in order to distribute the surface pressure of the swing bogie 14 evenly. According to FIG. 5, the power transmission means 41 according to the invention of the crawler-track unit are implemented mechanically. In the embodiment of FIG. 8, the mechanical implementation is a belt drive, with the aid of which power is transmitted from the drive shaft 80 of the swing bogie 14 to the drive wheel. A gearwheel 81, which the drive belt 88 encircles, is preferably attached to the swing-bogie 14 side of the drive shaft. To the same shaft 84 as the drive wheel 25 a gearwheel 85 is attached, which rotates the shaft by means of the drive belt 88. In addition, the swing bogie's power transmission means 86 preferably include a tensioner gearwheel 90, which, for example, by spring loading or with the aid of hydraulic pressure keeps the drive belt 88 tight and prevents the drive belt 88 slipping. A chain, which is a more durable alternative, is preferably used instead of the drive belt. Though in FIG. 8 the crawler-track unit's power transmission means are clearly shown, it should be understood that the swing bogie's power transmission means are encased, in order to protect them from, for example, snow, water, and mud. In to addition the swing bogies preferably include means for lubricating the swing bogie's power transmission means with oil.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A forest machine, comprising:
a chassis having sides;
two swing bogies, each swing bogie comprising a swing frame, second sides and at least two wheels mounted on the swing frame in bearings at a distance from each other;
a swing bearing configured to attach each swing bogie to said chassis;
a power transmission arranged through the swing bearing fitted in connection with the chassis to transmit power to the wheels of each swing bogie; and
a support formed by two pairs for each swing bogie and fitted between the chassis and the swing frame for supporting the swing frame at least sometimes on the chassis, each pair having a protrusion as a support surface and a rail as a counter surface in order to transmit lateral forces between the chassis and the swing frame during contact between the support surface and the counter surface, wherein each pair is located at a distance from one of the swing bearings, each on a separate side of one of the swing bearings, and in each pair the protrusion and the rail of one of the pair is attached to the side of the chassis and the protrusion and the rail of another of the pair is attached to a second side of the swing frame.

2. The forest machine according to claim 1, comprising a load space.

3. The forest machine according to claim 1, wherein at least one wheel in each swing bogie is a drive wheel.

4. The forest machine according to claim 3, wherein the power transmitted through the swing bearing is transmitted internally in each swing bogie's swing frame to the drive wheel.

5. The forest machine according to claim 1, wherein each swing bogie is supported on the forest machine's chassis with aid of the swing bearing placed symmetrically relative to each swing bogie.

6. The forest machine according to claim 1, wherein the support is arranged to receive both compressive and tensile forces.

7. The forest machine according to claim 1, wherein each pair includes two support surfaces and counter surfaces in each pair for transmitting compressive and tensile forces.

8. The forest machine according to claim 7, wherein the protrusion includes a structure protruding from the protrusion in a transverse direction of the protrusion, on which the support surfaces are formed to make transverse planes to the protrusion and the rail includes shape-closing counter surfaces corresponding to the support surfaces of the protruding structure of the protrusion to create shape-closing locking.

9. The forest machine according to claim 1, wherein in each pair, the counter surface is shaped to be curved, to correspond to a path of motion of the support surface when each swing bogie swings.

10. The forest machine according to claim 1, wherein the distance of each pair from the swing bearing is 20-45% of length of the swing frame in a longitudinal direction between the wheels.

11. The forest machine according to claim 1, wherein the distance of each pair from the swing bearing is 35-40% of length of the swing frame in a longitudinal direction between the wheels.

12. The forest machine according to claim 1, comprising a crawler-track unit, which includes an endless crawler track and each swing bogie with wheels.

13. The forest machine according to claim 1, comprising attachment equipment for attaching the support surface of each pair to the swing frame and attaching the counter surface to the forest machine's chassis.

14. The forest machine according to claim 1, wherein the support is a separate component from the swing bearing.

15. The forest machine according to claim 1, wherein the support surface and the counter surface are equally far from the swing bearing and are opposite to each other.

16. The forest machine according to claim 13, wherein the attachment equipment comprises bolts and openings for the bolts formed in the swing frame, the forest machine's chassis, and the support.

17. The forest machine according to claim 1, wherein the support surface and the counter surface both form planes, wherein said planes are perpendicular to the axis of rotation of the swing bearing.

* * * * *